United States Patent [19]

Ceprini et al.

[11] 4,401,798

[45] Aug. 30, 1983

[54] PROCESS FOR THE PRODUCTION OF VINYL HALIDE POLYMERS THAT USES AN ALKYL-SUBSTITUTED TRISPHENOL AS THE CHAIN-TERMINATING AGENT

[75] Inventors: Mario Q. Ceprini, Cedarhurst, N.Y.; Donald Goodman, Flemington, N.J.; Samuel Hoch, Brooklyn, N.Y.

[73] Assignee: Tenneco Polymers, Inc., Houston, Tex.

[21] Appl. No.: 370,876

[22] Filed: Apr. 22, 1982

[51] Int. Cl.[3] .......................... C08F 6/02; C08F 14/06
[52] U.S. Cl. ..................................... 526/84; 524/348; 526/210; 526/330; 526/344; 526/344.2
[58] Field of Search ................. 524/348; 526/84, 210, 526/330, 344, 344.2

[56] References Cited

U.S. PATENT DOCUMENTS 3,808,184  4/1974  Sheth et al. ......................... 526/84
3,985,721  10/1976  Petit ..................................... 526/84

*Primary Examiner*—Harry Wong, Jr.
*Attorney, Agent, or Firm*—Evelyn Berlow

[57] ABSTRACT

The polymerization of a monomer component that comprises vinyl chloride in an aqueous medium in the presence of a free radical generating polymerization initiator is terminated by introducing into the polymerization reaction mixture when from 70% to 95% of the monomer component has been polymerized from 0.01% to 0.10% by weight, based on the weight of the monomer component, of a chain-terminating agent that is an alkyl-substituted trisphenol, such as 1,1,3-tris(2-methyl-4-hydroxy-5-tert.butylphenyl)butane.

6 Claims, No Drawings

PROCESS FOR THE PRODUCTION OF VINYL HALIDE POLYMERS THAT USES AN ALKYL-SUBSTITUTED TRISPHENOL AS THE CHAIN-TERMINATING AGENT

This invention relates to an improved process for the production of vinyl halide polymers. More particularly, it relates to a process for the polymerization of a monomer component that comprises a vinyl halide in an aqueous medium in the presence of a free radical generating polymerization initiator in which the chain-terminating agent is an alkyl-substituted trisphenol.

BACKGROUND OF THE INVENTION

In the production of vinyl halide polymers, it is common practice to stop the polymerization reaction by which these polymers are produced at a stage prior to that at which the reaction would ordinarily come to a halt in order to obtain stable uniform products having the desired porosity, melt viscosity, and other properties. Chain termination is usually effected by incorporating in the polymerization mixture a compound that will act as a chain-terminating or shortstopping agent for the polymerization reaction without adversely affecting the color of the vinyl halide polymer. The chain-terminating agent also serves to prevent polymerization of recovered monomer and to inhibit degradation of the polymer when it is heated during the monomer-removal steps and/or the drying step of the process.

In U.S. Pat. No. 2,662,867, Hoertz disclosed the use of water-soluble phenols, quinones, and nitro-aromatic compounds as chain-terminating agents in the preparation of vinyl chloride polymers. He taught that these compounds function as free radical scavengers that react with the free radicals that arise from residual catalyst, from active polymer chains, and from reaction between unreacted monomer and residual catalyst. He further indicated that the addition of these chain-terminating agents stabilizes the polymer not by reacting with the liberated hydrohalogen acid but rather by destroying the free radicals in the dispersion before polymer decomposition is inaugurated.

There are several disadvantages to the use of the chain-terminating agents disclosed by Hoertz that preclude their use in the commercial production of vinyl chloride polymers. Because they are soluble in water, these phenols are present as pollutants in the effluent water streams from the polymerization process, or if they are retained in the resin they are susceptible to water-extraction from the finished goods. In addition, because of their toxicity and corrosiveness, the water-soluble phenols present hazards to those who manufacture the polymeric products or handle the finished goods that contain these polymers.

DETAILED DESCRIPTION OF THE INVENTION

In accordance with this invention, it has been found that when the chain-terminating agent used in a polymerization process in which a monomer component that comprises a vinyl halide is polymerized in an aqueous medium in the presence of a free radical generating polymerization initiator is an alkyl-substituted trisphenol having the structural formula

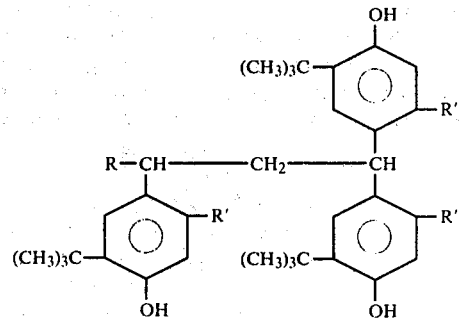

wherein R represents hydrogen or an alkyl group having 1 to 4 carbon atoms and each R' represents an alkyl group having 1 to 4 carbon atoms the process is more efficient and economical to carry out than when the previously-known chain-terminating agents are used.

Illustrative of the chain-terminating agents that can be used in the process of this invention are the following compounds:

1,1,3-Tris(2-methyl-4-hydroxy-5-tert.butylphenyl)propane 1,1,3-Tris(2-methyl-4-hydroxy-5-tert.butylphenyl)butane 1,1,3-Tris(2-methyl-4-hydroxy-5-ethylphenyl)butane 1,1,3-Tris(2-methyl-4-hydroxy-5-tert.butylphenyl)pentane 1,1,3-Tris(2-methyl-4-hydroxy-5-tert.butylphenyl)heptane 1,1,3-Tris(2-ethyl-4-hydroxy-5-tert.butylphenyl)butane 1,1,3-Tris(2-butyl-4-hydroxy-5-tert.butylphenyl)butane 1,1,3-Tris(2-propyl-4-hydroxy-5-tert.butylphenyl)hexane and the like and mixtures thereof.

The preferred chain-terminating agent is 1,1,3-tris(2-methyl-4-hydroxy-5-tert.butylphenyl)butane, which has the structural formula

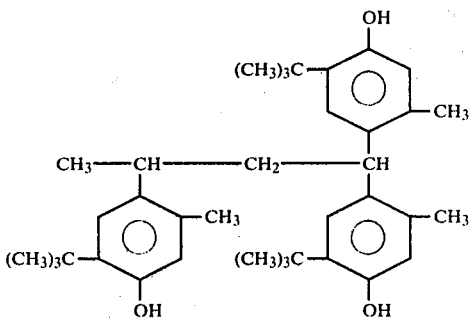

and which is marketed as 'Topanol' CA by ICI Americas, Inc. This product is a white crystalline powder that is substantially insoluble in water and that is relatively non-toxic and nonirritating to warm-blooded animals. Its insolubility in water minimizes contamination of the water effluent from suspension and emulsion polymerization processes and reduces or eliminates its water extractability from finished polyvinyl chloride products.

The amount of the alkyl-substituted trisphenol that is used in the practice of this invention is that which will terminate the polymerization reaction quickly and will stabilize the polymer from degradation that may occur during the monomer-removal step and/or the drying step without affecting the course of the polymerization reaction or the other properties of the products. In most cases, from 0.01% to 0.10% by weight, based on the weight of the monomer component of the polymerization reaction mixture, is used. Best results have been obtained when from 0.02% to 0.05% by weight of the chain-terminating agent, based on the weight of the monomer component, was used.

In the practice of the process of this invention, the chain-terminating agent is added to the aqueous polymerization reaction mixture when from about 70% to 95%, preferably 75% to 90%, of the monomer component has been converted to polymer. Thereafter, the unreacted vinyl chloride monomer is removed from the aqueous medium and the polymer is recovered and dried in the usual manner.

The process of this invention may be used in the production of vinyl halide homopolymers as well as polymers formed by the copolymerization of a vinyl halide with a waterinsoluble ethylenically-unsaturated monomer that is copolymerizable therewith. The vinyl halide is ordinarily and preferably vinyl chloride, but the bromide, fluoride, and iodine can also be used. Suitable comonomers include vinyl acetate, vinyl propionate, vinyl stearate, vinyl benzoate, ethylene, propylene, methyl methacrylate, ethyl acrylate, allyl acrylate, acrylamide, acrylonitrile, methacrylonitrile, vinylidene chloride, vinyl ethers, dialkyl fumarates and maleates, and the like. When one or more of the aforementioned comonomers are used, the monomer component contains at least 70 percent by weight of the vinyl halide. It is preferred that the monomer component consist essentially of vinyl chloride or that it contain about 80 percent to 90 percent by weight of vinyl chloride and 10 percent to 20 percent by weight of vinyl acetate.

The polymerization reactions of this invention are carried out in the conventional manner using the well-known emulsion or suspension polymerization techniques. In the suspension polymerization process, a vinyl halide or a mixture of a vinyl halide with at least one comonomer is suspended in water by the use of suspending agents and agitation. The polymerization is started by means of a free radical generating polymerization initiator, such as lauroyl peroxide, benzoyl peroxide, diisopropyl peroxydicarbonate, tertiary butyl peroxypivalate, azobisisobutyronitrile, azobis-2,4-dimethylvaleronitrile, combinations of dialkyl peroxydicarbonates and lauroyl peroxide, sulfonyl peroxides, and the like. Suspending agents, such as methylcellulose, hydroxymethylcellulose, hydroxyethylcellulose, hydroxypropylmethylcellulose, hydrolyzed polyvinyl acetate, gelatin, methyl vinyl ether-maleic anhydride copolymers, and mixtures thereof, are included in the polymerization reaction mixture. In the emulsion polymerization process, vinyl halide homopolymers and copolymers are prepared using such initiators as hydrogen peroxide, organic peroxides, persulfates, and redox systems and such surface-active agents as alkyl sulfates, alkane sulfonates, alkylaryl sulfonates, and fatty acid soaps. The polymerization is usually carried out at a temperature in the range of 40° C. to 80° C. The polymers that are produced may be separated and dried by spray-, drum-, or tray-drying techniques.

The invention is further illustrated by the following examples.

EXAMPLE 1

A series of vinyl chloride polymers was prepared in a stirred autoclave by the following procedure: A polymerization system that consisted of 955 grams of deionized water, 45 grams of a cellulose ether derivative (Methocel as a 2% aqueous solution), 0.2 grams of sodium bicarbonate (as a 4.4% aqueous solution) 0.17 gram of lauroyl peroxide, 0.36 gram of di-2-ethylhexyl peroxydicarbonate (as a 40% solution in mineral spirits), and 550 grams of vinyl chloride was charged to a two-liter autoclave. The temperature was gradually raised to the polymerization temperature of 56° C., and an equilibrium pressure of 125-130 psi was obtained. After approximately 4 hours, the polymerization reaction was 85-90% complete, and the pressure began to drop. When the pressure in the autoclave reached 115-120 psi, a solution of a chain-terminating agent in toluene was added to the polymer dispersion in the autoclave. Starting when the pressure in the autoclave reached 105-110 psi, pressure readings were taken every 10 minutes for one hour. At the end of this time, the autoclave was vented. The polymer dispersion was filtered, and the recovered polymer was dried at 40° C. for about 8 hours.

The chain-terminating agents used and the pressure drops that were observed after the addition of the chain-terminating agent are set forth in Table I.

TABLE I

| | Chain-terminating Agent | Amount of Chain-terminating Agent Charged | | Pressure Drop (Pounds per hour) |
|---|---|---|---|---|
| | | Gram | Part/100 parts of vinyl chloride | |
| Ex. No. | | | | |
| 1 | 1,1,3-Tris(2-methyl-4-hydroxy-5-tert.butylphenyl)butane | 0.14 | 0.025 | 11 |
| Comparative Examples | | | | |
| A | 2,6-Di-tert.butyl-p-cresol (BHT) | 0.55 | 0.100 | 11 |
| B | None | — | — | 28 |

The color, porosity, and melt viscosity of the product of Example 1 were equivalent to those of the product of Comparative Example A.

EXAMPLE 2

Polyvinyl chloride resin compositions were prepared by mixing 100 parts by weight of polyvinyl chloride prepared by the procedure of Example 1 or a comparative polymer with 20 parts by weight of di-2-ethylhexyl phthalate, 5 parts by weight of epoxidized soybean oil, 1 part by weight of mineral oil, and 1 part by weight of a thiotin stabilizer. (Nuostabe ® V-1562—Tenneco Chemicals, Inc.).

The heat stability of the compositions was determined by working 58 grams of each of the compositions in a Brabender Plasticorder No. 3 using a No. 6 roller head, a bowl temperature of 190° C., and a rotor speed of 60 rpm. After the material has fused, samples were removed periodically until degradation had taken place as indicated by dark amber or black coloration of the sample. The results obtained are summarized in Table II.

TABLE II

| Ex. No. | PVC Used in the Composition | Degradation Time (Minutes at 190° C.) |
| --- | --- | --- |
| 2 | Product of Ex. 1 | 34 |
| Comparative Example | | |
| C | Product of Comp. Ex. A | 34 |
| D | Product of Comp. Ex. B | 28 |

From the data in Tables I and II, it will be seen that the chain-terminating agent of this invention is more efficient than the commercially-used chain-terminating agent BHT in that it provided equivalent inhibiting effect on the polymerization reaction and equivalent heat stability when only one-fourth as much was used.

Each of the other alkyl-substituted trisphenols disclosed herein can be used in a similar way as the chain-terminating agent in the polymerization of a monomer component that comprises a vinyl halide to form polymers that have improved long term heat stability and other valuable properties.

What is claimed is:

1. In the process for the polymerization of a monomer component selected from the group consisting of vinyl halides and mixtures of a vinyl halide with at least one ethylenically-unsaturated monomer that is copolymerizable therewith, said mixtures containing at least 70% by weight of the vinyl halide, in an aqueous medium at a temperature in the range of 40° C. to 80° C. in the presence of a free radical generating polymerization initiator, the improvement that comprises adding to the polymerization reaction mixture when from about 70% to 95% of the monomer component has been polymerized from 0.01% to 0.10% by weight, based on the weight of the monomer component, of a chain-terminating agent having the structural formula

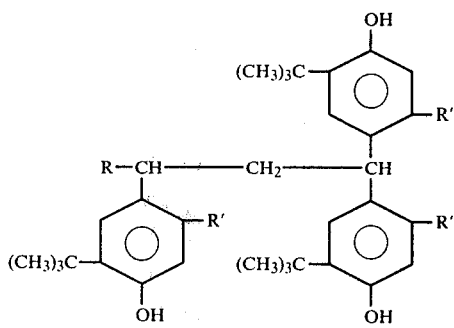

wherein R represents hydrogen or an alkyl group having 1 to 4 carbon atoms and each R' represents an alkyl group having 1 to 4 carbon atoms.

2. The process of claim 1 wherein the chain-terminating agent is added to the polymerization reaction mixture when from 75% to 90% of the monomer component has been polymerized.

3. The process of claim 1 wherein from 0.02% to 0.05% by weight, based on the weight of the monomer component, of the chain-terminating agent is added to the polymerization reaction mixture.

4. The process of claim 1 wherein the chain-terminating agent is 1,1,3-tris(2-methyl-4-hydroxy-5-tert.butylphenyl)butane.

5. The process of claim 1 wherein the monomer component consists essentially of vinyl chloride.

6. The process of claim 1 wherein the monomer component contains 80% to 90% by weight of vinyl chloride and 10% to 20% by weight of vinyl acetate.

* * * * *

Notice of Adverse Decision in Interference

In Interference No. 101,363, involving Patent No. 4,401,798, M. Q. Ceprini, D. Goodman and S. Hoch, PROCESS FOR THE PRODUCTION OF VINYL HALIDE POLYMERS THAT USES AN ALKYL-SUBSTITUTED TRISPHENOL AS THE CHAIN-TERMINATING AGENT, final judgment adverse to the patentees was rendered Aug. 12, 1985, as to claims 1-6.

[*Official Gazette November 26, 1985.*]